Jan. 14, 1941.   D. G. RENNO   2,228,535
VEHICLE BODY
Original Filed June 23, 1939
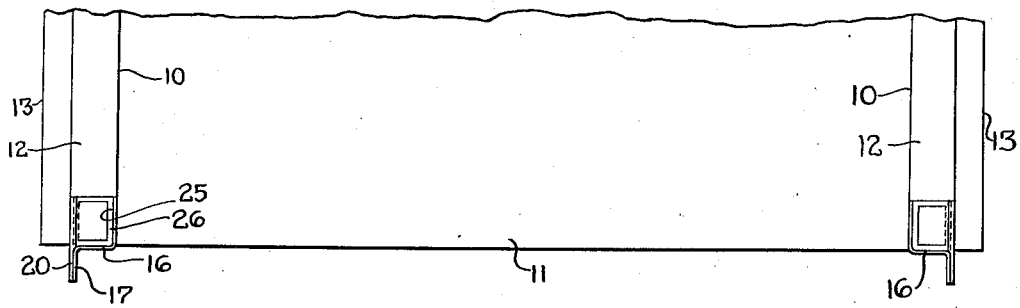
Fig. 1
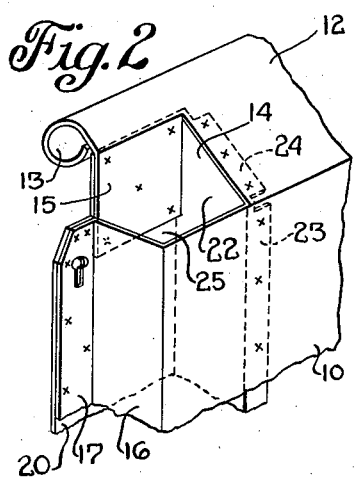
Fig. 2
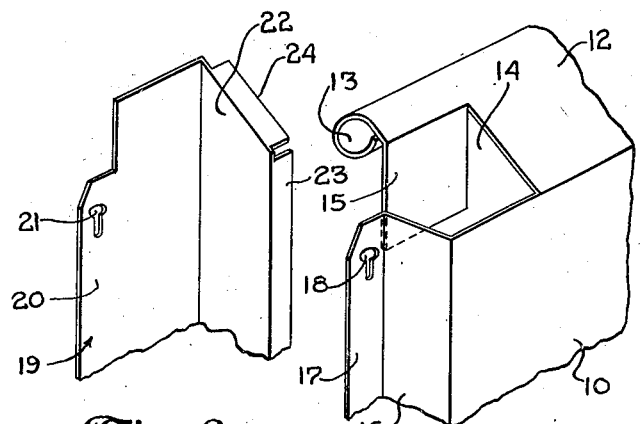
Fig. 3
Fig. 4
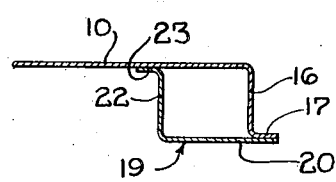
Fig. 5
Inventor
Donald G. Renno
By Paul O. Pippel
Att'y.

Patented Jan. 14, 1941

2,228,535

UNITED STATES PATENT OFFICE 2,228,535

VEHICLE BODY

Donald G. Renno, Fort Wayne, Ind., assignor to International Harvester Company, a corporation of New Jersey Original application June 23, 1939, Serial No. 280,738. Divided and this application June 26, 1940, Serial No. 342,429

10 Claims. (Cl. 296—30)

This invention relates to a vehicle body and more particularly to a sheet metal body construction in which rigid corner posts are provided at the corners thereof, being formed from integral portions of the body walls or panels. This application is a division of applicant's copending application, Serial No. 280,738, filed June 23, 1939.

The invention contemplates and has for its principal object the provision of a light-weight sheet metal body construction in which adjacent walls are joined to form corner posts from extending portions rigidly carried by the walls.

An important object is to provide a reenforcing sheet at one corner of the vehicle serving to provide a box-like construction constituting also a stake pocket.

Another object is to provide a construction of the type referred to which includes portions rigidly secured to portions of a wing or flange carried by the side panel of the body.

Another object is to produce a less expensive, light, strong, and usable body better adapted to modern production facilities, such as welding and assembling equipment.

And, another object is to obtain rigid, box-like or tubular construction at the rear corners of the body with fewer components and with a greater strength utilization of material consumed. Incidental to this is the facilitated manufacture and lower cost through reduction in number of parts, assembling and handling operations.

The basic purpose and accomplishment of the rear corner construction is to so shape the side panels in the reenforcing sheet that they are naturally reenforcing when combined, providing a rigid box-corner and eliminating the extra pillars commonly used.

Briefly and specifically, these and other important objects are achieved in one preferred embodiment of the invention by the provision of a vehicle body construction having opposite side walls or panels. A rear end portion of each panel is bent laterally outwardly and has then a portion extending rearwardly parallel to the panel proper. A reenforcing sheet is secured against the last named portion to provide a double thickness wall at the edge of an offset portion adapted to receive one side of an end-gate. The reenforcing sheet continues forwardly parallel to the panel, and is then bent inwardly at right angles and a portion thereof flanged and secured to the side panel. The panel further includes a wing or flange portion, inclining upwardly and outwardly, secured to the reenforcing member and having an opening therein registering with the stake pocket thus formed by the panel and reenforcing member.

A more complete understanding of the objects and desirable features of the invention may be had from the accompanying sheet of drawings, in which:

Figure 1 is a plan view of the rear portion of a vehicle body;

Figure 2 is an enlarged perspective view showing the assembled construction of one corner of the body;

Figures 3 and 4 are, respectively, views of the reenforcing or stake-forming sheet, and the rear portion of a side panel; and, Figure 5 is a sectional view, showing the relation between the different extensions or portions on the panel or reenforcing member.

The vehicle body generally designated in Figure 1 may be of any conventional type and has a pair of opposite side walls or panels 10 and a floor 11. The rear end of the body is open and is adapted to be closed by a suitable end-gate, not shown. Each side panel includes an upwardly and outwardly extending wing or flange 12, the outer edge of which is rolled, as at 13, to stiffen the part. The rear portion of the flange 12 is partially cut away to provide an opening or cut-out 14, an integral portion of the flange remaining and being bent downwardly to provide a securing portion in the form of a tab 15.

As best shown in Figures 4 and 5, the rear portion of a panel 10 has a laterally outwardly extending portion or extension 16, preferably disposed at a right angle to the panel proper. This portion 16 includes a second extension 17, paralleling, but extending away from, the panel 10. The upper portion of the extension 17 is provided with an opening 18, for purposes to appear presently. The upper edges of the extensions 16 and 17 are disposed at the same height as the upper edge portion of the panel 10 formed by the junction between the panel 10 and the wing or flange 12.

A reenforcing sheet or stake-forming member, generally designated in Figure 3 at 19, comprises a first extension or sheet portion 20 adapted to be rigidly secured to the extension 17 on the panel 19. This portion is provided with an opening 21 which is alined with the opening 18 in the extension 17. The two openings, when the parts are secured together, are adapted to receive a suitable locking means, not shown, for an end-gate or the like. The wall or sheet 20 of the member 19 extends forwardly and parallel to the panel 10, having at its forward portion an inwardly directed, right angle extension 22. The inner edge of the extension 22 is flanged, as at 23, and is adapted to be rigidly secured to the outer portion of the panel 10. The upper edge of the sheet or extension 20 is disposed at a height considerably higher than the upper edge of the panel 10; that is, the upper edge of the extension 20 is adapted to meet the wing or flange 12 adjacent the rolled bead 13, the tab 15 on the wing fitting inside the extension, as shown in Figure 2. The upper inclined portion of the extension 22 on the member 19 is flanged at 24 and is rigidly secured to the under side of the wing 12. As further shown in Figure 2, the construction is such that the parts may be rigidly secured together as by welding. The association between the extension 17 on the panel 10 and the rear portion of the extension 20 on the member 19 is such as to provide a double thickness wall portion, offset laterally from the panel proper. The shape of the parts provides for a stake pocket 25, which, as shown in Figure 1, carries a vertical stake 26. The corner of the body is thus admirably reenforced, and the use of separate reenforcing pillars is eliminated.

From the foregoing description of the improved body construction it will be seen that a desirable rear corner construction has been provided. Other objects, in addition to those specified above, will be apparent to those skilled in the art. It will be understood, of course, that only a preferred embodiment of the invention has been illustrated and described and that numerous modifications and alterations may be made therein without departing from the spirit and scope of the invention as defined in the appended claims.

What is claimed is:

1. In a vehicle body construction, a rear corner structure comprising a side panel provided at its rear end with an outward right angle extension, a rearward extension parallel to the side panel connected to said extension, said extensions forming an offset for receiving an end-gate, and a reenforcing and stake pocket-forming member comprising a piece of sheet metal having one portion lying in contact with and secured to the rearward parallel extension on the side wall, said member extending forwardly in spaced parallel relation to the side wall and being formed with an inwardly directed right angle extension contacting the side wall being formed with a securing flange lying in contact with and rigidly secured to the side wall.

2. In a vehicle body construction, a rear corner construction comprising a side panel provided at its rear end with an outward right angle extension and a rearward extension parallel to the side panel, said extensions forming an offset for receiving an end-gate, and a reenforcing and stake pocket-forming member comprising a piece of sheet metal having one portion lying in contact with and secured to the rearward parallel extension on the side wall, said member extending forwardly in spaced parallel relation to the side wall and being formed with a right angle extension directed inwardly into contact with the side wall, said side panel being formed with an upper portion extending at an angle upwardly and outwardly, said portion being provided with an opening registering with the area defined by the pocket-forming member.

3. In a vehicle body having opposite side panels extending to the rear, the rear end of the body being open, a pair of rear corner constructions provided respectively at the rear ends of the panels, each corner comprising an extension directed laterally away from a panel and a reenforcing sheet secured to the extension and having a portion extending forwardly parallel to the panel and a second portion directed laterally toward the panel and secured to the panel, the rear end of the panel and the portions on the reenforcing sheet forming a corner stake pocket, the other corner being similarly constructed and arranged in transverse alinement with the first corner.

4. In a vehicle body having opposite side panels extending to the rear, each panel including an upper outwardly directed flange, the rear end of the body being open, a pair of rear corner constructions provided respectively at the rear ends of the panels, each corner comprising an extension directed laterally away from a panel and a reenforcing sheet secured to the extension and having a portion extending forwardly parallel to the panel and a second portion directed laterally toward the panel and secured to the panel, the rear end of the panel and the portions on the reenforcing sheet forming a corner stake pocket, the respective flange being cut out to coincide with the pocket, the other corner being similarly constructed and arranged in transverse alinement with the first corner.

5. In a vehicle body having opposite side panels extending to the rear, each panel including an upper outwardly directed flange, the rear end of the body being open, a pair of rear corner constructions provided respectively at the rear ends of the panels, each corner comprising an extension directed laterally away from a panel and a reenforcing sheet secured to the extension and having a portion extending forwardly parallel to the panel and a second portion directed laterally toward the panel and secured to the panel, the rear end of the panel and the portions on the reenforcing sheet forming a corner stake pocket, the respective flange being cut out to coincide with the pocket, the flange being secured to the reenforcing sheet, the other corner being similarly constructed and arranged in transverse alinement with the first corner.

6. In a vehicle body construction, a rear corner construction comprising a side panel provided at its rear end with an outward right angle extension and a rearward extension parallel to the side panel, said extensions forming an offset for receiving an end-gate, and a reenforcing and stake pocket-forming member comprising a piece of sheet metal having one portion lying in contact with and secured to the rearward parallel extension on the side wall, said member extending forwardly in spaced parallel relation to the side wall and being formed with a right angle extension directed inwardly into contact with the side wall, said side panel being formed with an upper portion extending at an angle upwardly and outwardly, said portion being cut out partially to provide an opening registering with the area defined by the pocket-forming member and having remaining thereon a tab bent downwardly and secured to the pocket-forming member.

7. In a vehicle body construction, a rear corner structure comprising a side panel provided at its rear end with an outward right angle extension, a rearward extension parallel to the side panel connected to said extension, and a reenforcing and stake pocket-forming member comprising a piece of sheet metal having one portion lying flatly against and secured to the rearward parallel extension on the side wall to provide a double thickness wall portion, said member extending forwardly in spaced parallel relation to the side wall and being formed with an inwardly directed right angle extension contacting the side wall being formed with a securing flange lying in contact with and rigidly secured to the side wall.

8. In a vehicle body construction, a rear corner structure comprising a side panel provided at its rear end with an outward right angle extension, a forwardly directed extension connected to the first extension and disposed parallel to the panel, said second extension having its upper edge disposed at a height above the upper edge of the panel, and an inward extension connected at its outer edge to the forward edge of the second extension and at its inner edge to the panel, and a flange member secured at its inner edge to the upper edge of the panel and inclining upwardly and outwardly and having its outer edge secured to the upper edge of the second extension.

9. In a vehicle body construction, a rear corner structure comprising a side panel provided at its rear end with an outward extension, a forwardly directed extension connected to the first extension and having a portion thereof disposed in spaced relation to the panel, said second extension having a portion of its upper edge disposed at a height above the upper edge of the panel, an inward extension connected to the second extension and to the panel, and a flange member secured to the upper edge of the panel and inclining upwardly and outwardly and having its outer edge secured to the upper edge of the second extension.

10. In a vehicle body construction, a rear corner structure comprising a side panel provided at its rear end with an outward extension, a forwardly directed extension connected to the first extension and having a portion thereof disposed in spaced relation to the panel, said second extension having a portion of its upper edge disposed at a height above the upper edge of the panel, an inward extension connected to the second extension and to the panel to form a stake pocket, and a flange member secured to the upper edge of the panel and inclining upwardly and outwardly and having its outer edge secured to the upper edge of the second extension, said flange having an opening therein registering with the stake pocket.

DONALD G. RENNO.